J. OLSON.
FISH HOOK.
APPLICATION FILED JULY 1, 1910.

986,747.

Patented Mar. 14, 1911.

Witnesses
Wm. S. Jordan.
R. M. Hall.

Inventor John Olson,
by Egerton R. Case
atty.

UNITED STATES PATENT OFFICE.

JOHN OLSON, OF VANCOUVER, BRITISH COLUMBIA, CANADA.

FISH-HOOK.

986,747. Specification of Letters Patent. Patented Mar. 14, 1911.

Application filed July 1, 1910. Serial No. 570,022.

*To all whom it may concern:*

Be it known that I, JOHN OLSON, a subject of the King of Great Britain, residing in the city of Vancouver, in the Province of British Columbia, Canada, have invented certain new and useful Improvements in Fish-Hooks, of which the following is a specification.

My invention relates to improvements in fish hooks, and the chief object of my invention is to so associate and mount two fish hooks suitably formed, that they will not spread when being pulled through the water, but which will, immediately the fish strikes, automatically spread, thereby giving the hooks the greatest possible grip in the fish, so that no matter how much the fish may struggle, he cannot free himself therefrom.

Further objects of my invention will be hereinafter set forth, and the preferred construction of my invention will hereinafter be more particularly described, and the parts I claim as new will be pointed out in the claims forming part of this specification.

Figure 1:
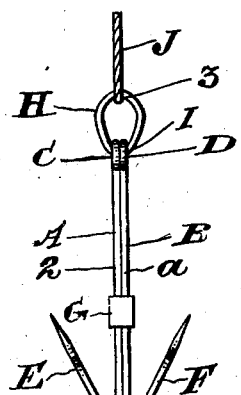
Figure 2:
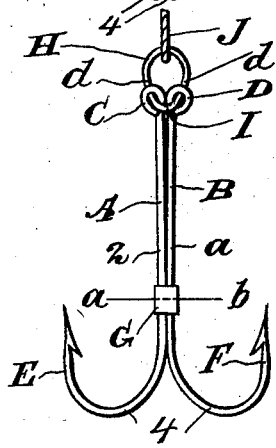
Figure 3:
Figure 4:
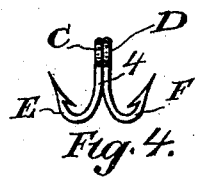

Figure 1 is a front elevation of my fish hook in normal position. Fig. 2 is a perspective view of my fish hook showing the members thereof in the position they occupy when they are spread apart. Fig. 3, is a cross section on the line $a$—$b$, Fig. 2, and Fig. 4 is a plan view of my hook with ring and leader removed.

In the drawings, like characters of reference indicate corresponding parts in each figure.

A and B are two fish hooks, the eyes C and D of which are formed as particularly shown in Fig. 1 so that they will extend toward the front of the hook, and not at right angles to the barbed ends of the hook, as is usually the position occupied of these eyes in the ordinary hook. The barbed ends E and F of the said hooks are bent in opposite directions as shown in Fig. 1, which illustrates the normal position of the hooks A and B.

G is a metal strap or ring carried by the shank of one of the hooks, for instance the shank 2 of the hook A, and in this strap or ring is held the shank $a$ of the hook B.

H is a ring which passes through the eyes C and D. This ring is preferably made substantially oval shaped, and the normal position of the same, in respect of the fish hooks, positions the eyes C and D within the end I thereof, and it will therefore be understood that when the hook is drawn through the water by means of the usual leader J which is attached to the ring H, the hooks A and B will occupy the position shown in Fig. 1. Immediately a fish strikes the hook and begins to pull, the barbed ends E and F will spread and assume the position shown in Fig. 2, thus giving this hook a very positive hold. Because of the substantially oval-shaped form of the ring H, the eyes C and D assume the position shown in Fig. 2 in respect of the sides $d$ when the ends E and F spread.

As I have illustrated and described my invention, the shank $a$ of the hook B is free to turn in the metal strap or ring G, and this construction allows both of the said fish hooks more or less movement parallel to each other.

As each barbed end E and F occupies the angle shown to its respective shank, it is clear that each barbed end must be embedded in the fish's mouth at an angle to its shank. As each barb is embedded in the fish's mouth, this action will have a tendency to spring each barbed end laterally away from its shank, but as each hook is too strongly constructed to admit of a material springing of the barbed end away from its shank, the shank of the hook will essentially turn and so allow the barbed end to become firmly embedded. The cartilage or bony part of the mouth of a great many fishes is very tough. Now as the barbed ends become embedded in this cartilage or bony part, this very act will force the barbed ends apart and turn the hooks on their shanks, because the body of cartilage between the barbed ends will not be crushed as the hooks become more deeply embedded in the mouth, but, by reason of its toughness, it will force the hooks apart and cause them to spread. The angular-disposition of the barbed ends E and F is of course essential to the obtaining of the described movement.

When my fish hooks are in normal position shown in Fig. 1, the lower curved portions 4 of each shank abuts each other for a certain distance, as shown particularly in Fig. 4, and this preferred construction enables me to give the barbed ends E and F the most advantageous angular position in respect to each other.

Upon referring to Figs. 1 and 2 it will be seen that the oval-shaped ring H is slightly elongated, and that the apex 3 thereof is on a line with the middle of the end I. This construction anchors the leader J in the ring H so that the pull exerted by the leader will substantially bisect the end I, thus always keeping the ring H in such a position as to allow of the desired movement of the hooks A and B.

In my preferred form of construction it will be seen that the shanks of the hooks are substantially straight and lie normally substantially parallel.

I do not confine myself to the construction herein shown and described, except in so far as that may be rendered necessary by the prior state of the art and the terms of my claims.

What I claim as my invention is:

1. As a new article of manufacture, a fish hook comprising the combination of two hooks having substantially straight shanks each provided at its upper end with an eye bent toward the front of the hook, the shanks of the hooks terminating in lower curved portions which normally abut each other, the barbed end of each hook being bent angularly outward each away from the other; a substantially oval-shaped ring passing through said eyes so that its smaller end will be occupied by said eyes, and means embracing the shanks of said hooks and coacting with said ring so that each shank of the said hooks may turn on its longitudinal axis in order to allow the said barbed ends to move apart when the hooks are being embedded in the mouth of the fish, as and for the purpose specified.

2. As a new article of manufacture, a fish hook comprising the combination of two hooks having substantially straight shanks, each provided at its upper end with an eye bent toward the front of the hook, the shanks of the hooks terminating in lower curved portions which normally abut each other; the barbed end of each hook being bent angularly outward each away from the other; a substantially oval-shaped ring passing through said eyes so that its smaller end will be occupied by said eyes, and a metal strap carried by the shank of one of the hooks and embracing the shank of the other hook, and coacting with said ring so that each shank of the said hooks may turn on its longitudinal axis in order to allow the said barbed ends to move apart when the hooks are being embedded in the mouth of the fish, as and for the purpose specified.

3. As a new article of manufacture, a fish hook comprising the combination of two hooks having substantially straight shanks, each provided at its upper end with an eye bent toward the front of the hook, the shanks of the hooks terminating in lower curved portions which normally abut each other, the barbed end of each hook being bent angularly outward each away from the other; means embracing said shanks in such a manner as to hold said hooks in relationship and yet allow each shank to turn on its longitudinal axis when said barbed ends are forced apart; a substantially oval-shaped ring passing through said eyes which normally rest in the smaller end thereof, and a leader anchored in the bend or depression in the said larger end, as and for the purpose specified.

In testimony whereof I have affixed my signature in presence of two witnesses.

JOHN OLSON.

Witnesses:
E. F. E. SARGENT,
LILIAN COTTAM.

---

Copies of this patent may be obtained for five cents each, by addressing the "Commissioner of Patents, Washington, D. C."